United States Patent [19]

Balasubramanian

[11] 4,204,772
[45] May 27, 1980

[54] OPTICAL MEASURING SYSTEM

[75] Inventor: N. Balasubramanian, Cupertino, Calif.

[73] Assignee: Recognition Systems, Inc., Van Nuys, Calif.

[21] Appl. No.: 945,628

[22] Filed: Sep. 25, 1078

[51] Int. Cl.$^2$ .............................................. G01C 3/00
[52] U.S. Cl. ...................................... 356/376; 356/1; 356/4; 356/16
[58] Field of Search ..................... 356/1, 3, 4, 16, 372, 356/373, 375, 376, 381

[56] References Cited

U.S. PATENT DOCUMENTS

| | | | |
|---|---|---|---|
| 3,589,815 | 6/1971 | Hosterman | 356/375 |
| 3,941,476 | 3/1976 | Stauffer | 356/16 |
| 4,070,116 | 1/1978 | Frosch et al. | 356/372 |

Primary Examiner—John K. Corbin
Assistant Examiner—R. A. Rosenberger
Attorney, Agent, or Firm—Ralph B. Pastoriza

[57] ABSTRACT

A non-contacting optical probe incorporates an optical system designed to measure distances between various surfaces which may be internal or external such as exists in molds and the like. A collimated light beam is passed off-center through a first lens and focused to a first point on a first surface coplanar with the focal plane of the lens. When the distance between the first surface and the optical probe carrying the collimated beam changes so that a second surface is presented, this second surface is no longer in the focal plane with the result that a laterally displaced image of the point of interception of the collimated beam with the point of the intersection of the optical axis of the system occurs. This lateral displacement is imaged back through the optical system to a sensing surface. The primary focusing lens is then physically shifted along its optical axis to bring the focal plane into coplanar relationship with the second surface, the amount of lens movement being readily determined when the laterally displaced image point on the sensor surface is brought into coincidence with the center optical axis of the lens system on the sensor surface. The distance through which the lens is physically moved then corresponds precisely to the distance between the first and second surfaces.

6 Claims, 3 Drawing Figures

OPTICAL MEASURING SYSTEM

This invention relates generally to optical measuring devices and more particularly to a non-contacting optical system for measuring relief surfaces as exist inside molds, engine block bores and the like.

BACKGROUND OF THE INVENTION

Many applications require the measurement of point coordinates of surfaces both inside and outside. Contacting probes such as simple calipers as well as non-contacting probes such as capacitance gauges, air gauges and the like, have been developed to meet such needs. However, none of these is suitable to measure enclosed surfaces representing very small diameters and are not typically fast and flexible to be attractive.

BRIEF DESCRIPTION OF THE PRESENT INVENTION

With the foregoing in mind, the present invention contemplates an optical measuring system capable of point coordinate measurements highly suitable for measuring internal and external surfaces in a quick and accurate manner, all to the end that data on surfaces can readily be obtained far more quickly and with greater accuracy than has been possible with distance measuring devices heretofore used.

More particularly, in accord with the basic method of this invention, a collimated light beam is passed through a first lens having a focal plane coincident with a first surface. The collimated beam passes in a direction parallel to and displaced from the optical axis of the first lens so that the collimated beam is focused to a first point coincident with the point of intersection of the optical axis of the first lens in this focal plane. Light from this first point passing back along the optical axis and through the first lens is then re-imaged with a second lens onto a sensor surface. Relative movement is then effected between the optical system and the second surface to position this second surface for interception of the collimated beam at a second point. This second point is laterally displaced from the point of intersection of the optical axis with this second surface by an amount directly proportional to the distance of the second surface from the focal plane of the first lens which focal plane corresponds with the position of the first surface. Light from this second point is then re-imaged by the second lens onto the sensor surface, the image of the second point being laterally displaced from the image of the first point on the sensor surface. The first lens can now be physically moved along its optical axis relative to the second surface until the second point image on the sensor surface reaches the position that the first point image on the sensor surface occupied, thereby positioning the focal plane of the first lens in a position coplanar with the second surface. The physical distance over which the first lens is moved can then be measured and this distance is precisely equal to the distance between the first and second surfaces.

Movement of the first lens along its optical axis can be effected automatically by a feedback signal from the sensor so that automatic tracking of the relief of a surface by the collimated beam passing out the end of a probe can be realized.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figure 1:
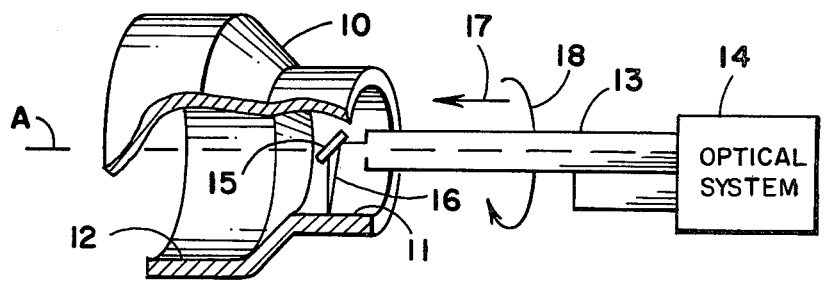
FIG. 1 is a diagramtic view partly in broken away perspective, illustrating the optical measuring system of this invention for measuring the inside radii of a mold member.

Referring first to FIG. 1, there is shown, merely by way of example, a mold 10 having internal first and second surfaces 11 and 12. Shown extending into one side of the mold along the axis of the mold is an optical probe 13 extending from an optical system 14. The probe 13 terminates in a 45° angled mirror 15 for passing a converging light beam 16 onto a first surface 11 of the mold 10.

In the particular example illustrated in FIG. 1, the optical system is to be used to measure the distance between, for example, the first and second surfaces 11 and 12; that is, the change in the radii of the internal cylindrical surfaces of the mold 10. Towards this end, the probe is first positioned so that the beam 16 strikes the surface 11 and then subsequently moved inwardly along the axis A of the probe in the direction of the arrow 17 so that the collimated beam 16 will strike the second surface 12. It should be understood that if the surfaces surrounding the probe are irregular rather than cylindrical surfaces, the relief of the irregularities of the internal surfaces can readily be measured by simply rotating the probe as indicated by the arrow 18.

Figure 2:
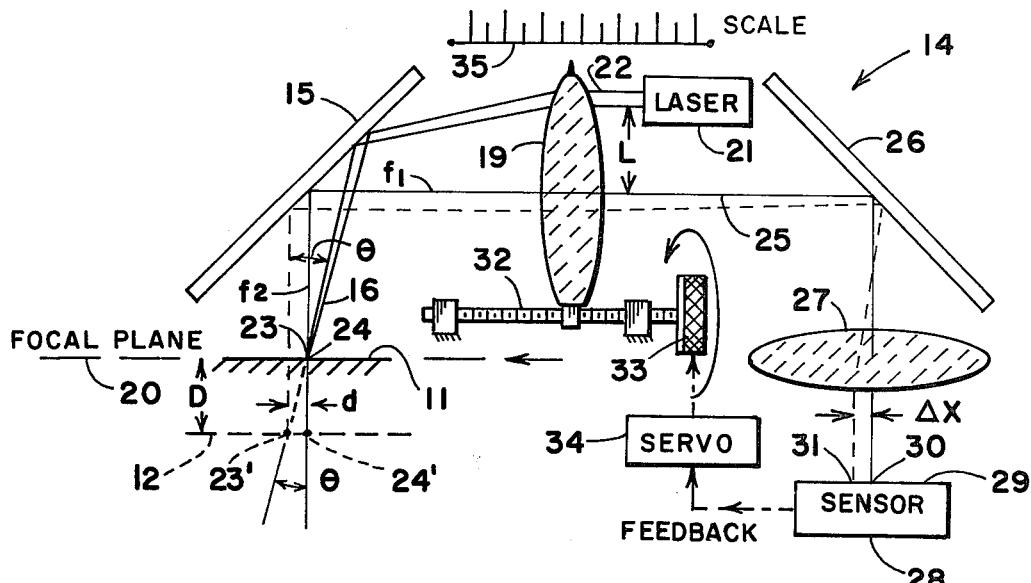
FIG. 2 is a highly schematic diagram illustrating the basic optical components of the system of FIG. 1; and, FIG. 3 is a view similar to FIG. 2, but illustrating the components in a position after a measurement has been made.

Referring now to FIG. 2, the manner in which the foregoing described measurements are made will become evident. Essentially, the optical system again designated generally by the arrow 14 in FIG. 2 includes a first lens 19 positioned in front of the 45° angled mirror 15. The arrangement is such that the focal plane of the lens 19 coincides with the first surface 11 reproduced in the left portion of FIG. 2. Essentially, if $f_o$ represents the focal length of the lens 19, then because of reflection by the mirror 15, the following relationship exists:

$$f_1 + f_2 = f_o \qquad (1)$$

where $f_1$ and $f_2$ represent the distance of the lens 19 from the mirror 15 and the distance of the focal plane 20 from the mirror 15, respectively.

Referring to the upper portion of FIG. 2, there is indicated a collimated light source preferably a laser 21 providing a collimated beam 22. Beam 22 is directed parallel to and displaced a distance L from the optical axis of the lens 19 and is less than ¼ the diameter of lens 19. Under these circumstances, the off-center passing of the collimated beam 22 through the lens 19 results in its being reflected by the mirror and being focused to a first point 23 coincident with the point 24 at which the optic axis represented by the line $f_2$ intersects the first surface 11; that is, the focal plane.

Light from this first focused point 23 passing back along the optic axis and through the lens 19 as along the line 25 is reflected by a second 45° mirror 26 through a second lens 27 which re-images the first point 23 on a sensor means 28, having a sensor surface 29. The re-imaged first point 23 will be re-imaged at the center of the sensor surface 29 as indicated at 30, this position corresponding to the optical axis of the second lens 27.

Consider now that the optical system 14 with the probe 13 is moved along the axis of the probe A in FIG. 1 until the beam 16 intersects the second surface 12. In FIG. 2, the position of this second surface is indicated by the dashed line 12 but because this surface is spaced further away from the probe than the first surface 11, the point at which the collimated beam 16 intersects the second surface will be laterally displaced from that point at which the optical axis intersects the second surface. In other words, the second surface has been displaced from the focal plane 20 and thus there is a crossing over of the axis of the collimated beam 16 and the optical axis of the lens to result in the displacement. The impingement point of the collimated beam 16 on the second surface is depicted schematically in FIG. 2 as at 23' and the displacement from the point 24' at which the optic axis intersects the second surface 12 is indicated by the letter d.

If $\theta$ is the angle between the beam 16 and the optical axis along the dimension $f_2$ as indicated in FIG. 2, then:

$$\tan\theta = L/f_o = d/D \quad (2)$$

where d is the actual displacement of the second point 23' from the intersection point 24' of the optical axis with the second surface 12. From equation (2)

$$d = DL/f_o \quad (3)$$

Still referring to FIG. 2, there is indicated by the dashed line the re-imaging of the second point 23' on the second surface 12 by the second lens 27. The re-imaged second point is shown at 31 on the sensor surface 29, the same being laterally displaced from the position occupied by the first point image 30. This displacement is indicated by the notation $\Delta x$. If the magnification of the lenses 19 and 25 is the same; that is, if their respective focal lengths are equal, then the displacement $\Delta x$ on the sensor surface 29 will be identical to the displacement d on the second surface 12.

As mentioned briefly heretofore, the first lens 19 may now be physically moved along its optic axis as by means, for example, of a lead screw 32 and cooperating turning knob 33. This movement may be effected by simple manual turning of the knob 33 or having the same responsive to a servo 34 in turn responsive to an appropriate signal from the sensor 28 proportional to the displacement $\Delta x$. Essentially, the first lens 19 is moved along its optic axis until the second point image 31 is moved into coincidence with the position occupied by the first point image 30 on the sensor surface. This action essentially shifts the focal plane of the lens 19 from a position coplanar with the first surface 11 to a position coplanar with the second surface 12.

Figure 3:
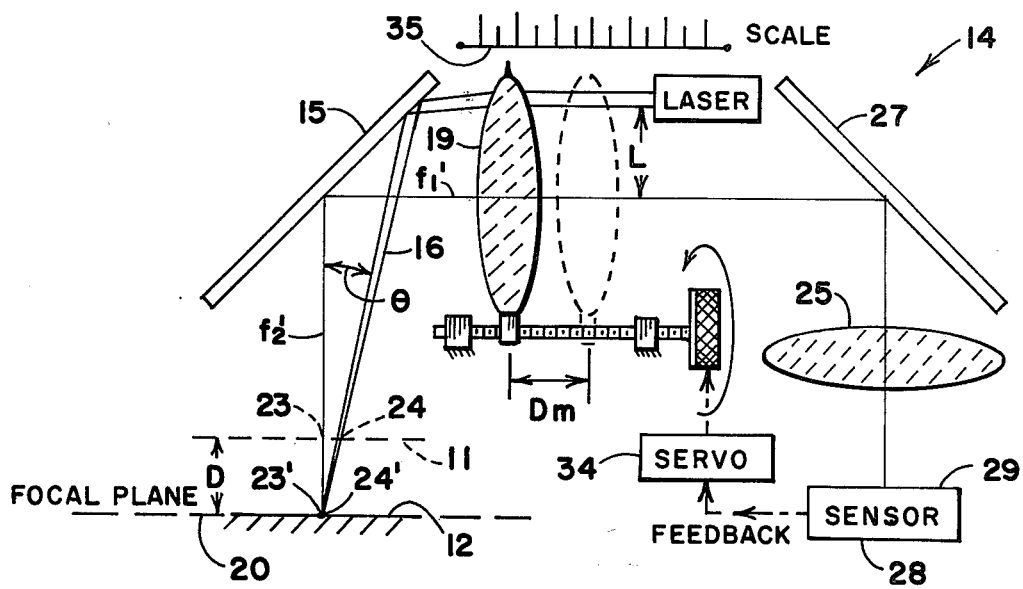

FIG. 3 illustrates the same set-up as shown in FIG. 2 except that the lens 19 has been shifted to bring its focal plane into coplanar relationship with the second surface 12.

Since the lens 19 has now been moved to a position where its focal plane is coplanar with the second surface 12, the beam 16 will have its impingement point 24' on the second surface 12 coincident with the intersection of the optical axis with the second surface 12, this latter intersection point being indicated at 23'. Accordingly, it will be clear that light from this second point 24' will pass back along the optical axis of the lens 19 and through the lens to be re-imaged on the sensor 29 in the original center position.

The actual physical distance that the lens 19 has been moved along its optical axis is indicated by the letter Dm. This distance Dm is exactly equal to the distance between the first and second surfaces 11 and 12 which distance is indicated by the letter D in both FIGS. 2 and 3. This equivalance will be evident from the following:

Referring to FIG. 3, if $f_1'$ is the new distance between the lens 19 and the mirror 15 and $f_2'$ is the new distance between the mirror 15 and the second surface 12, the following relationship exists:

$$f_1' + f_2' = f_1 + f_2 = f_o; \quad (4)$$

Also, $$f_2' = f_2 + Dm. \quad (5)$$

By inspection of FIG. 2 where D is the distance between the first and second surface, $$f_2' = f_2 + D \quad (6)$$

By comparing equation (6) with equation (5) it follows that:

$$D = Dm \quad (7)$$

Accordingly, by measuring the physical distance the lens 19 is moved, there is provided an exact measure of the distance between the first and second surfaces. An appropriate scale such as indicated at 35 may be provided for directly indicating or enabling a simple reading out of this distance. Alternatively, of course, an appropriate electronic digital read-out connected to a motion transducer could be provided.

Where the servo 34 is to be used to control movement of the lens 19, appropriate transducer means in the sensor 28 will provide an output signal constituting a function of the displacement $\Delta x$ of the imaged point relative to the center point on the sensor surface so that as the lens is moved to bring its focal plane closer and closer to the second surface, this lateral displacement $\Delta x$ will decrease, decreasing the signal accordingly so that the lens will stop at the proper position.

In the example illustrated in FIGS. 2 and 3, the measured surface distance increased from the first surface to the second surface. If this distance decreased so that the second surface were above the first surface as viewed in FIG. 2, then the lateral displacement of the imaged first point on the sensor surface 29 would be on the other side of the center point 30. The output signal from the sensor could be made negative for displacements to the left and positive for displacements to the right so that the lead screw 32 will be turned in the proper direction for making the desired measurement.

From the foregoing, it will be further understood that with the servo feedback, a continuous reading-out of distances of various surfaces from the end of the probe can be provided while the probe is moving within a structure such as the mold 10. Moreover, when the probe is rotated about its axis A, there will be provided a continuous read-out of the internal surface spacing or relief.

The probe can be designed with additional optical systems so that the cylindrical coordinates of any interior surface surrounding the probe can be provided simultaneously.

While the probe can be rotated to measure cylindrical coordinates of an interior surface, the axis of the probe need not be coaxial with the axis of the interior surface; that is, it may be off-set. Such offsetting causes no problem because even though the distance to the surface of the object is changing, the resulting measurements will indicate the circular profile as measured from such off-set position.

From all of the foregoing, it will be evident that the present invention has provided an optical measuring system which is rapid, accurate, and solves the problem of effecting measurements of minute internal surfaces.

I claim:

1. An optical method of measuring the distance between first and second surfaces with an optical system including the steps of:
   (a) passing a collimated light beam through a first lens having a focal plane coinciding with said first surface in a direction parallel to and displaced from the optical axis of said first lens so that said collimated beam is focused to a first point coinciding with the point of intersection of the optical axis of said first lens in said focal plane;
   (b) re-imaging light from said first point passing back along the optical axis and through said first lens with a second lens onto a sensor surface, said collimated light beam, first and second lens and sensor surface constituting part of said optical system;
   (c) effecting relative movement between said optical system and said second surface to position said second surface to intercept said collimated beam at a second point, said second point being laterally displaced from the point of intersection of the optical axis with said second surface by an amount directly proportional to the distance of said second surface from the focal plane of said first lens;
   (d) re-imaging light from said second point passing back through said first lens with said second lens onto said sensor surface, the image of said second point on said sensor surface being laterally displaced from the position occupied by the image of the first point on said sensor surface; and
   (e) moving said first lens along its optical axis relative to said second surface until the second point image on said sensor surface reaches the position that the first point image on said sensor surface occupied thereby positioning the focal plane of said first lens in a position coplanar with said second surface, the physical distance over which said first lens is moved indicating the distance between said first and second surfaces.

2. The method of claim 1, including the step of generating said collimated light beam with a laser, the diameter of said collimated beam being less than ¼ the diameter of said first lens.

3. An optical apparatus for measuring the distance between first and second surfaces, including, in combination:
   (a) a first lens positioned so that its focal plane coincides with said first surface;
   (b) a source of collimated light positioned to direct a collimated beam through said first lens in a direction parallel to and displaced from the optical axis of said first lens so that said collimated beam is focused to a first point on said first surface coinciding with the point of intersection of said optical axis of said first lens with said focal plane;
   (c) a second lens positioned on the optical axis of said first lens for receiving light from said first point passing back along said optical axis through said first lens;
   (d) a light sensor means having a sensing surface positioned to receive the image of said first point formed by said second lens, said collimated beam intersecting said second surface at a second point laterally displaced from the point of intersection of said optical axis with said second surface, the re-imaged second point on said sensor surface being laterally displaced from the position occupied by the image of the first point on said surface; and
   (e) means for physically moving said first lens along its said optical axis to thereby move the position of the focal plane of said first lens, whereby said focal plane can be repositioned into coplanar relationship with said second surface, the second point image on said sensor surface coinciding with the position occupied by the first point image on said sensor surface when said focal plane is coplanar with said second surface, the physical distance through which said first lens is moved by said means corresponding to the distance between said first and second surfaces.

4. An apparatus according to claim 3, in which said source of collimated light comprises a laser, the diameter of said collimated beam being less than ¼ the diameter of said first lens.

5. An apparatus according to claim 3, in which said light sensor includes means for providing a signal constituting a function of the lateral displacement between said first point image and said second point image on said sensor surface, said means for moving said first lens including servo means responsive to said signal so that a continuous automatic positioning of said first lens is effected in accord with varying distances between said first and second surfaces.

6. An apparatus according to claim 5, in which said apparatus includes an elongated probe coaxial with said optical axis and a 45° angled mirror at the end of said probe for directing said collimated beam at right angles to the axis of the probe whereby the internal relief of a surface surrounding the end portion of said probe can be continuously read out by rotating said probe about its axis.

* * * * *